A. CALAME.
POWER TRANSMISSION DEVICE.
APPLICATION FILED SEPT. 9, 1912.
1,057,526.
Patented Apr. 1, 1913.
2 SHEETS—SHEET 1.
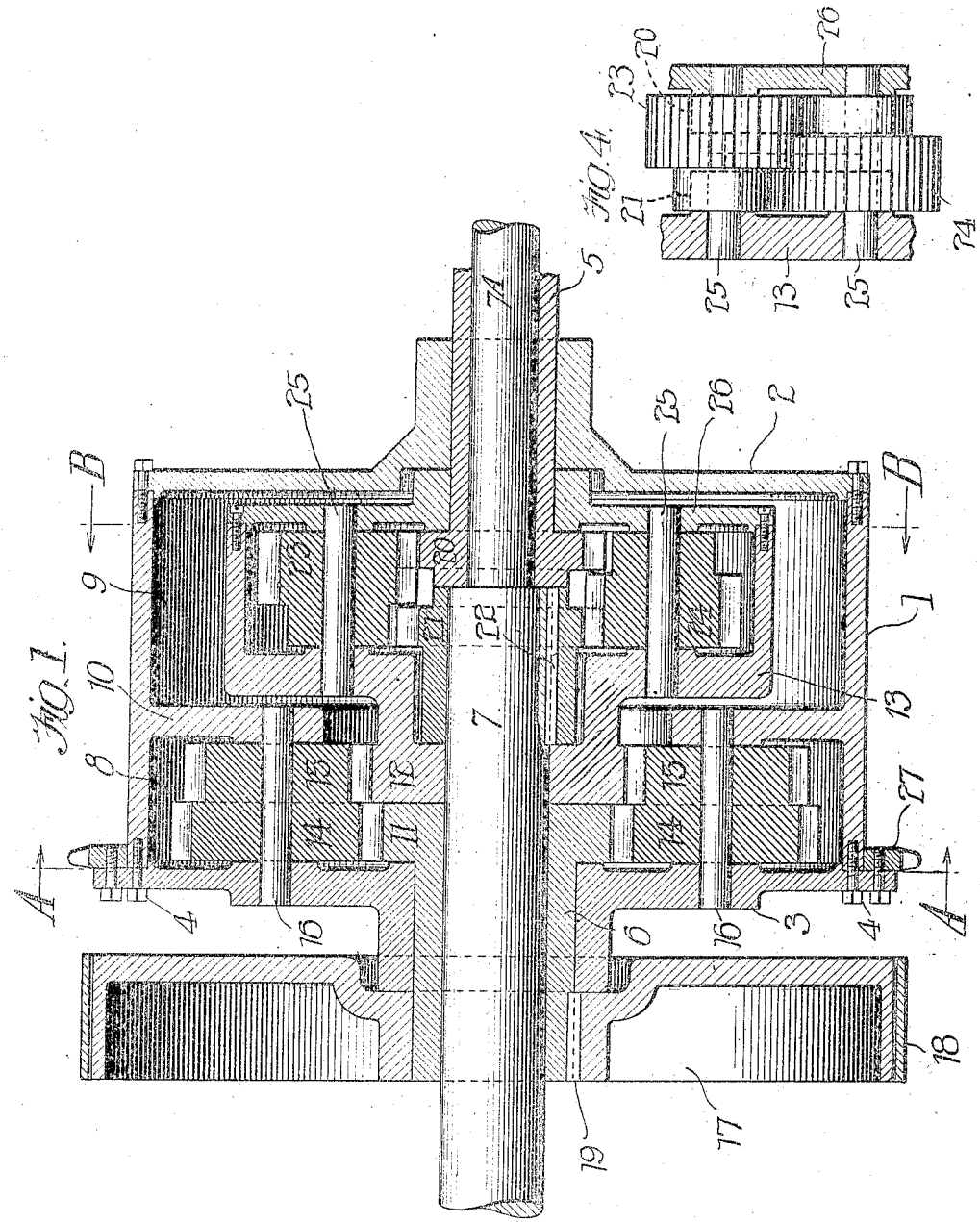

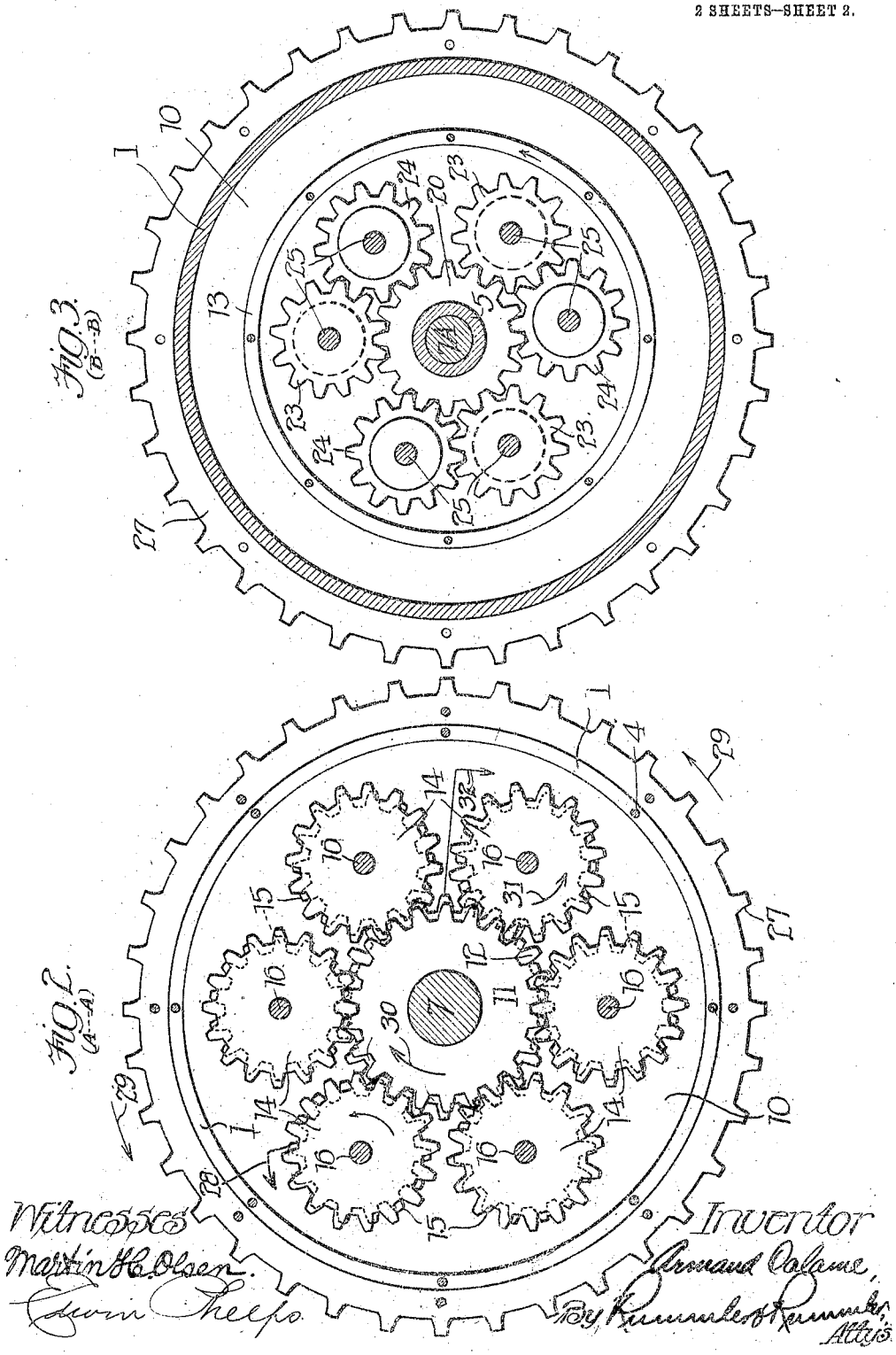

UNITED STATES PATENT OFFICE.

ARMAND CALAME, OF ELGIN, ILLINOIS.

POWER-TRANSMISSION DEVICE.

1,057,526.

Specification of Letters Patent. Patented Apr. 1, 1913.

Application filed September 9, 1912. Serial No. 719,323.

*To all whom it may concern:*

Be it known that I, ARMAND CALAME, a citizen of the United States of America, and a resident of Elgin, county of Kane, and State of Illinois, have invented certain new and useful Improvements in Power-Transmission Devices, of which the following is a specification.

The main objects of this invention are to provide an improved form of power transmission device, particularly adapted for use on motor driven vehicles operated by internal combustion engines and capable of serving the combined functions of reducing gear, differential gear, starting and stopping clutch; to provide a device of this kind which is especially adapted for direct application to the driving axle of a farm tractor, and to provide an improved construction for power transmission mechanism whereby all stationary journal boxes except two are eliminated and whereby the entire mechanism may be readily inclosed so as to run in an oil tight casing.

An illustrative embodiment of this invention suitable for application to a farm tractor is illustrated in the accompanying drawings, in which—

Figure 1 is a longitudinal section. Fig. 2 is a transverse section taken on the line A—A of Fig. 1. Fig. 3 is a transverse section taken on the line B—B of Fig. 1. Fig. 4 is a side elevation of one pair of gears of the differential.

In the form shown in the drawings the mechanism comprises in general a driving member, a driven member, a pair of driven shafts, and a rotatable brake member, all journaled in coaxial relation to each other, a planetary gear train carried by the driving member and geared to both the driven member and the brake member, and a train of differential gearing connecting the driven member with the driven shafts.

In the form shown the driving member is in the form of a rotatable hollow casing 1 having end plates 2 and 3 provided with hubs which serve as bearings for a pair of quill shafts 5 and 6, which in turn are rotatably mounted on the shaft 7, said shaft 7 being shown reduced in diameter at 7ᴬ to insure perfect alinement between it and the quill shaft 5. For use in a vehicle such as a farm tractor, the shaft 7 and the quill shaft 5 are connected at their ends with the driving wheels of the vehicle and might therefore be termed the driving shafts or axles of the vehicle. For convenience of reference these shafts will be hereinafter referred to as the driven shafts, on account of their relation to the casing or driving member 1. The casing is divided into two compartments 8 and 9 by an annular partition 10, the speed reducing gear trains being housed in the compartment 8 and the differential gearing being housed in the compartment 9.

The speed reducing gearing comprises a pair of gears 11 and 12 loosely journaled on the shaft 7, the gear 11 being integral with or fixed on the quill shaft 6, and the gear 12 being integral with or fixed on the driven member 13, upon which are mounted the planetary gears of the differential mechanism which will be hereinafter explained. A plurality of pairs of planetary pinions 14 and 15 are carried by shafts or arbors 16, which are mounted in the casing and arranged around the axis thereof in suitable manner to bear the strains. The pinions 14 and 15 of each pair are rigidly fastened together and respectively mesh with the gears 11 and 12. The gear 11 is connected to a rotatable brake member or drum 17 which coacts with a stationary brake member or band 18. A key 19 connects the brake member 17 with the quill shaft 6.

The differential gear mechanism comprises a pair of gears 21 and 20 respectively secured to the shaft 7 and the quill shaft 5, and a plurality of sets of planetary pinions 23 and 24 mounted on the driven member 13, which in turn is connected with the gear 12. The pinions 23 and 24 are arranged in pairs, one pinion 23 meshing with a corresponding pinion 24, and said pinions at the same time meshing with their respective gears 20 and 21. In order to prevent interference the gears 20 and 21 are spaced apart axially by hubs formed thereon, and the pinions 23 and 24 have their pitch faces of greater width than those of the gears 20 and 21 so that they overlap each other throughout the extent of the space between the gears 20 and 21. This relation of the pinions and gears of the differential gear train can be clearly seen in Figs. 1 and 3. For convenience in supporting the studs or shafts 25 which carry the pinions 23 and 24, the member 13 is provided with a peripheral flange to which is connected a disk 26 which supports the adjacent ends of the shafts 25.

Any suitable means may be provided for applying power for rotating the casing 1, and in the form shown the casing is provided with a sprocket wheel 27 for connection by means of a link belt to the engine shaft.

The operation of the device shown is as follows: Assuming for example, that the casing 1 is continuously driven in one direction by the engine, then the gears in the compartment 8 will rotate in the direction indicated by the arrows in Fig. 2. Assuming also that there is a load on the driven shafts 7 and 5, such as would be the case if they are connected to vehicle wheels resting on the ground, then if the brake member 17 is free to rotate, the resistance of the parts connected with the gear 12 will be greater than that of the parts connected with the gear 11, and during the rotation of the casing 1 the pinions 15 will roll idly on the periphery of the gear 12 and will cause the gears 14 to rotate the pinion 11. The engine will thus run idly without rotating the shafts 7 and 5. If, on the other hand, the brake band 18 is set up so as to grip and prevent rotation of the brake drum 17, the gear 11 will be held stationary and the power applied to the casing 1 will be transmitted through the planetary gear trains 14 and 15 to the gear 12. Rotation of the gear 12 will be transmitted through the differential gear train in the usual manner, driving the shafts 7 and 5 at equal angular speeds in the same direction. Differential movement of the shafts 5 and 7 is permissible in the usual manner regardless of whether the member 13 is being rotated by the gear 12 or not. During such differential movement the gear 20 drives the pinion 23, which drives its mate 24, which in turn drives the gear 21.

From the foregoing it will be seen that when the brake band 18 is engaged with the drum 17, the shafts 5 and 7 will be positively driven, and when the brake band is released the gearing will simply run idle without transmitting power to the shafts 7 and 5.

Although but one specific embodiment of this invention has been herein shown and described, it will be understood that numerous details of the construction shown may be altered or omitted without departing from the spirit of this invention as defined by the following claims.

I claim:—

1. In a power transmission device, the combination of a driving member, a driven member, and a brake member journaled in coaxial relation to each other; a pair of planetary pinions on one of said members, and having driving relation to each other; a pair of gears respectively connected to the other said members and respectively meshing with said planetary pinions whereby said brake member will control the driving relation between said driving and driven member; and a casing carried by one of said members and inclosing all of said gearing.

2. A power transmission device, comprising a pair of shafts, a driving member, a driven member, and a brake member, all journaled in coaxial relation to each other; differential gearing connecting said driven member and said shafts; a pair of gears journaled in coaxial relation to said shafts and respectively connected to said driven and brake members; a gear train carried by said driving member and comprising a pair of pinions meshing respectively with the gears on said brake and driven members; and a casing carried by one of said members and inclosing all of said gearing.

3. In a power transmission device, the combination of a driving member, a pair of coaxially arranged shafts, a pair of gears loosely mounted on one of said shafts within said driving member, a pair of planetary pinions journaled on said driving member, said pinions being rigidly connected together and respectively meshing with said gears, a driven member rigidly connected to one of said gears, differential gear mechanism interposed between said driven member and said shafts and adapted to cause said shafts to rotate with said driven member, and also adapted to permit relative rotation of said shafts, and mechanism independent of said driving member and adapted to hold the other said gear against rotation and thereby control the driving relation between said driving member and said shafts.

Signed at Chicago this 6th day of September, 1912.

ARMAND CALAME.

Witnesses:
Geo. G. Carlson,
J. M. Manley.